United States Patent [19]
Whitten

[11] Patent Number: 5,805,795
[45] Date of Patent: Sep. 8, 1998

[54] METHOD AND COMPUTER PROGRAM PRODUCT FOR GENERATING A COMPUTER PROGRAM PRODUCT TEST THAT INCLUDES AN OPTIMIZED SET OF COMPUTER PROGRAM PRODUCT TEST CASES, AND METHOD FOR SELECTING SAME

[75] Inventor: Thomas G. Whitten, Colorado Springs, Colo.

[73] Assignee: Sun Microsystems, Inc., Palo Alto, Calif.

[21] Appl. No.: 583,713

[22] Filed: Jan. 5, 1996

[51] Int. Cl.$^6$ ..................................................... G06F 11/00
[52] U.S. Cl. ................................ 395/183.14; 395/183.08
[58] Field of Search ......................... 395/183.13, 183.14, 395/183.15, 184.01, 701, 704, 705, 709, 183.08, 183.09; 371/27.1, 27.4

[56] References Cited

U.S. PATENT DOCUMENTS

| | | | |
|---|---|---|---|
| 5,414,836 | 5/1995 | Baer et al. | 395/183.14 |
| 5,455,938 | 10/1995 | Ahmed | 395/183.13 |
| 5,500,941 | 3/1996 | Gil | 395/183.14 |
| 5,604,895 | 2/1997 | Raimi | 395/183.13 |

OTHER PUBLICATIONS

Goldberg, "Genetic Algorithms in Search, Optimization and Machine Learning", Addison–Wesley, Chapters 1–2. Jan. 1989.

Joacoby et al., "Test Coverage Dependent Software Reliability Estimation By The HGD Model", IEEE Software Reliability Engineering Synoposium, pp. 193–204. 1992.

Harrold et al., "A Mthodology For Controlling The Size Of A Test Suite", IEEE Software Maintenance Conference, pp. 302–310. 1990.

Lyn et al., "A Coverage Analysis Tool For The Effectiveness Of Software Testing", IEEE Trans. on Reliability, vol. 43 Iss. 4, pp. 527–535. Dec. 1994.

Belli et al., "A Test Coverage Notion For Logic Programming", IEEE Software relianility engineering Synoposium, pp. 133–142. 1995.

Geist et al., "Estimation And Enhancement of Real Time Software Reliability Through Mutation Analysis", IEEE Tans. on Computers, vol. 41, Iss. 5, pp. 550–558. May 1992.

McGlynn, "Test Case Generator",IBM TDB vol. 27, No. 5 pp. 3153–3155. Oct. 1984.

*Primary Examiner*—Joseph Palys
*Attorney, Agent, or Firm*—Richard A. Bachand; William J. Kubida; Holland & Hart LLP

[57] ABSTRACT

A method for selecting a set of test cases which may be used to test a software program product is disclosed. The program to be tested may have a number of code blocks that may be exercised during execution of the program. The method includes identifying each of the code blocks that may be exercised, and determining a time for executing each of the test cases in the set. A set of the test cases is then selected that exercises a maximum number of the identified code blocks that can be exercised in a minimum time. The selection step may be performed by executing a genetic algorithm for determining which subset of test cases to use, using a combination of time and coverage as a fitness value.

3 Claims, 3 Drawing Sheets

| STARTING NUMBER | INITIAL POPULATION | FITNESS VALUE | NUMBER OF STRINGS IN NEW POPULATION |
|---|---|---|---|
| 1 | 0•••1 | 11 | 3 |
| 2 | 1•••0 | 47 | 7 |
| • | • | • | • |
| • | • | • | • |
| • | • | • | • |
| L | 0•••0 | 2 | 0 |

TOTAL FITNESS:1097

| | | ORDERED FOR MATING | | | |
|---|---|---|---|---|---|
| STARTING NUMBER | SELECTED POPULATION | STARTING NUMBER | SELECTED POPULATION | CROSSOVER POINT | NEXT POPULATION |
| 1 | 10•••01 | 3 | 11•••00 | 2 | 11 01 |
| 2 | 11•••00 | L | 00•••01 | • | 00 00 |
| • | • | • | • | • | • • |
| • | • | • | • | • | • • |
| • | • | • | • | • | |
| L-1 | 11•••11 | 1 | 10•••10 | • | 10 00 |
| L | 01•••01 | 7 | 00•••00 | 13 | 00 10 |

METHOD AND COMPUTER PROGRAM PRODUCT FOR GENERATING A COMPUTER PROGRAM PRODUCT TEST THAT INCLUDES AN OPTIMIZED SET OF COMPUTER PROGRAM PRODUCT TEST CASES, AND METHOD FOR SELECTING SAME

BACKGROUND OF THE INVENTION

1. Field of the Invention

This invention relates to improvements in methods, computer program products, computer systems, and apparatuses for testing software products, or the like.

2. Background Information

Producers of software products generally test their products extensively to assure proper operation of the products on as many various operating systems and computer models as possible. As software products become more lengthy and complex, the software product tests also have become more lengthy and complex, requiring ever increasing amounts of time to perform. The development of routines to test the software products, therefore, have become of concern, especially considering the market demands of producing adequately tested software in reasonable amounts of time.

Typically, to develop a suitable test for a particular software product, a software test designer studies the product specifications, extracts a list of product features, and generates a number of "assertions" regarding the software product. An assertion is, for example, a specification of the behavior of the program, or part thereof, when it is operating properly, a statement of how the program is expected to operate under certain conditions, or other appropriate performance or result oriented product expectation.

For each assertion, the designer then develops a set of "test cases" in the form of software that exercises as many as possible of the code blocks in the product to prove the validity of the assertions. Typically, a designer may generate hundreds, even thousands, of test cases for a typical complex software product, so choosing a particular set of test cases to apply can be difficult, particularly if an optimal, or nearly optimal, set of test cases is sought to be generated. (The term "optimal" is used herein to mean that the test coverage is maximized across a preselected number of product code blocks in a minimized preselected amount of time.) If each assertion is proven for a particular computer model and operating system, the software product is considered to be fully tested for that particular system.

For a particular software product, however, to run all of the test cases on all possible combinations of computer models and operating systems on which the product may be run may require an enormous amount of testing time. Not uncommonly, for example, in modern software products which have thousands or hundreds of thousands of lines of code, running all of the test cases on a single operating system to prove all of the assertions throughout all of the code blocks and code paths within the product may take a number of weeks. As software products become more and more complex, it can be expected that this time will become even larger. When this time is multiplied by the total number of operating systems and computer models on which the product is to be tested, it can be seen that an enormous amount of time is required for product testing, which translates into significantly increased production cost for the product, and significantly increased delays in distributing the product or bringing the product to market.

Typically, product features are not totally independent. For example, most software products are constructed using a number of subroutines, calls, branches, loops, and other program techniques to perform operations that are common to multiple independent portions of the software, and which therefore are often repeatedly used by different parts of the program in which they are incorporated. Consequently, any particular test strategy often performs a redundancy of tests on the same or common portions of the software. Thus, many of the code blocks in the product may be exercised multiple times. It will be appreciated that such multiple redundant tests may be unnecessary, and almost always increase the cost associated with the testing.

The testing costs may be additionally increased if the testing is performed in a critical path of product development, since the test execution requires dedicated computers during the test execution cycle. Moreover, in the development of such tests, in the past, the tests have not been optimized to provide as comprehensive a test as possible in a minimum time, which also results in additional increased costs associated with the testing.

What is needed, therefore, is a method for establishing or selecting a set of test cases for a software product that maximizes the number of code blocks that are exercised in the software product and minimizes the execution time for the tests.

SUMMARY OF THE INVENTION

In light of the above, therefore, and according to a broad aspect of the invention, a computer program product is presented. The computer program product includes a computer useable medium having computer readable code embodied therein for causing a software test routine to be generated to test another computer program product, herein the "product to be tested." The product to be tested has multiple code blocks of computer code that may be selectively executed. At least some of the blocks are exercised by more than one of the test cases, resulting in some of the blocks being executed multiple times if all of the test cases are run. The computer program product also has computer readable program code devices configured to cause a computer to effect an identification of all of the code blocks which can be executed in the product to be tested. The computer readable program product additionally has computer readable program code devices configured to cause a computer to effect a measure of time for executing each of the selected test cases, as well as computer readable program code devices configured to cause a computer to effect an identification of a set of test cases that exercises a maximum number of the identified code blocks that can be executed in a minimum time.

The computer readable program code devices configured to cause a computer to effect an identification of a set of the test cases may be provided by computer readable program code devices configured to cause a computer to execute a genetic algorithm for determining which test cases to use to exercise the software program product using test time and code coverage as a fitness value.

According to another broad aspect of the invention, a method is presented for selecting a set of test cases for use in generating a test routine to test a target software program having a number of possible code blocks that may be exercised during execution of the test program. At least some of the code blocks may be exercised during an exercise of more than one test case, so that running all of the possible test cases results in redundant tests being performed. The method includes identifying each of the code blocks that may be exercised. After the code blocks are identified, a time for executing each of the test cases is determined. Thereafter, a set of the test cases that exercises a maximum number of the identified code blocks in a minimum time are identified. The step of identifying a set of the test cases that exercises a maximum number of the identified code blocks in a minimum time may be performed by executing a genetic algorithm for determining which set, or subset, of test cases to use, using a combination of time and coverage as a fitness value.

According to yet another broad aspect of the invention, a method for selecting a set of test cases for use in testing a target software program having a number of possible code blocks that may be exercised during execution of the test program is presented. An exercise of at least some of the code blocks may be common to an exercise of more than one test case, so that running all of the test cases results in redundant tests being performed. The method includes providing for identifying each of the code blocks that may be executed and providing for determining a time for executing each of the test cases. The method also includes providing for identifying a set of the test cases that exercises a maximum number of the identified code blocks in a minimum time. The step of providing for identifying a set of the test cases may be performed by providing for executing a genetic algorithm for determining which of the test cases to exercise, using time and coverage as a fitness value.

According to still yet another broad aspect of the invention, a method is presented for selecting a set of test cases for testing a target software program having a number of code blocks that may be exercised during execution of the program. The method includes executing a genetic algorithm that determines a set of test cases that exercises a maximum number of code blocks in a minimum time.

In still yet another broad aspect of the invention, a computer system is presented for identifying a set of test cases to test a software program having a number of possible code blocks that may be exercised during execution of the program. At least some of the test cases exercise common code blocks, so that the use of all of the possible test cases results in redundant tests being performed. The computer system includes a compiler for identifying each of the code blocks that may be executed and a timer for determining a time for executing each of the test cases. The computer system also includes a comparator for identifying a set of the test cases that exercises a maximum number of the identified code blocks in a minimum time. The comparator may include a digital computer programmed to execute a genetic algorithm for determining which set of test cases to use to exercise the product, using time and code coverage as a fitness value.

BRIEF DESCRIPTION OF THE DRAWINGS

The aforementioned and other features of the invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
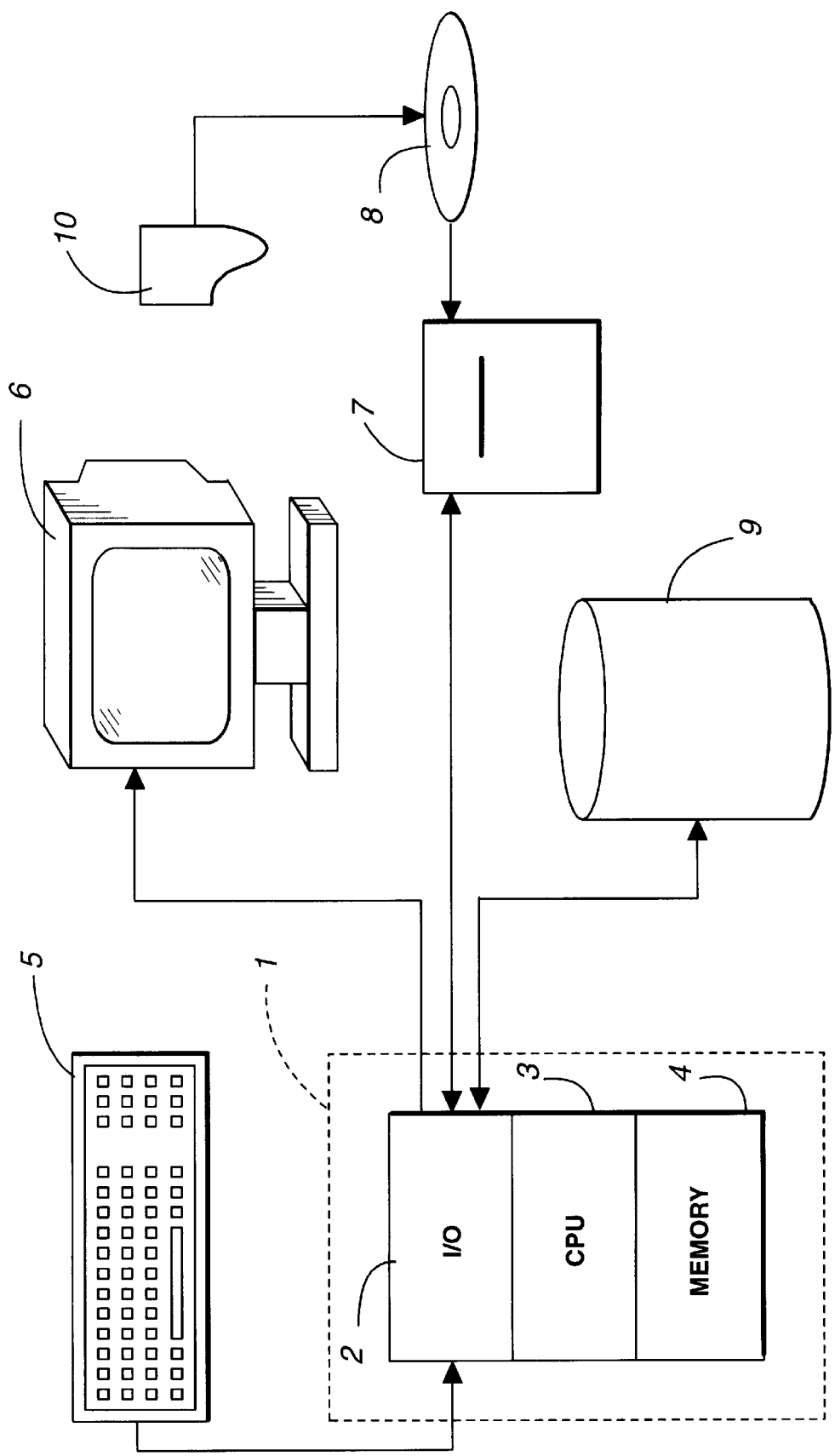
FIG. 1 is one environment in which the present invention may be used.

One environment in which the present invention may be used encompasses a general distributed computing system, wherein general purpose computers, workstations, personal computers, or the like are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage 9, and a CD-ROM drive unit 7. The CD-ROM drive unit 7 can read a CD-ROM medium 8, which typically contains programs 10 and data. The computer program products containing mechanisms to effectuate the apparatus and methods of the invention may reside in the memory section 4, or on a disk storage unit 9, or on the CD-ROM medium 8 of such a system. It should be noted that preferably the invention results in the generation of a computer program product for testing other computer program products. It will be understood that the computer program product preferably is created or generated in a computer useable medium having computer readable code embodied therein for causing a computer program product to be generated. The computer useable medium preferably contains a number of computer readable program code devices configured to cause a computer to effect the various functions required to carry out the invention, as herein described.

Figure 2:
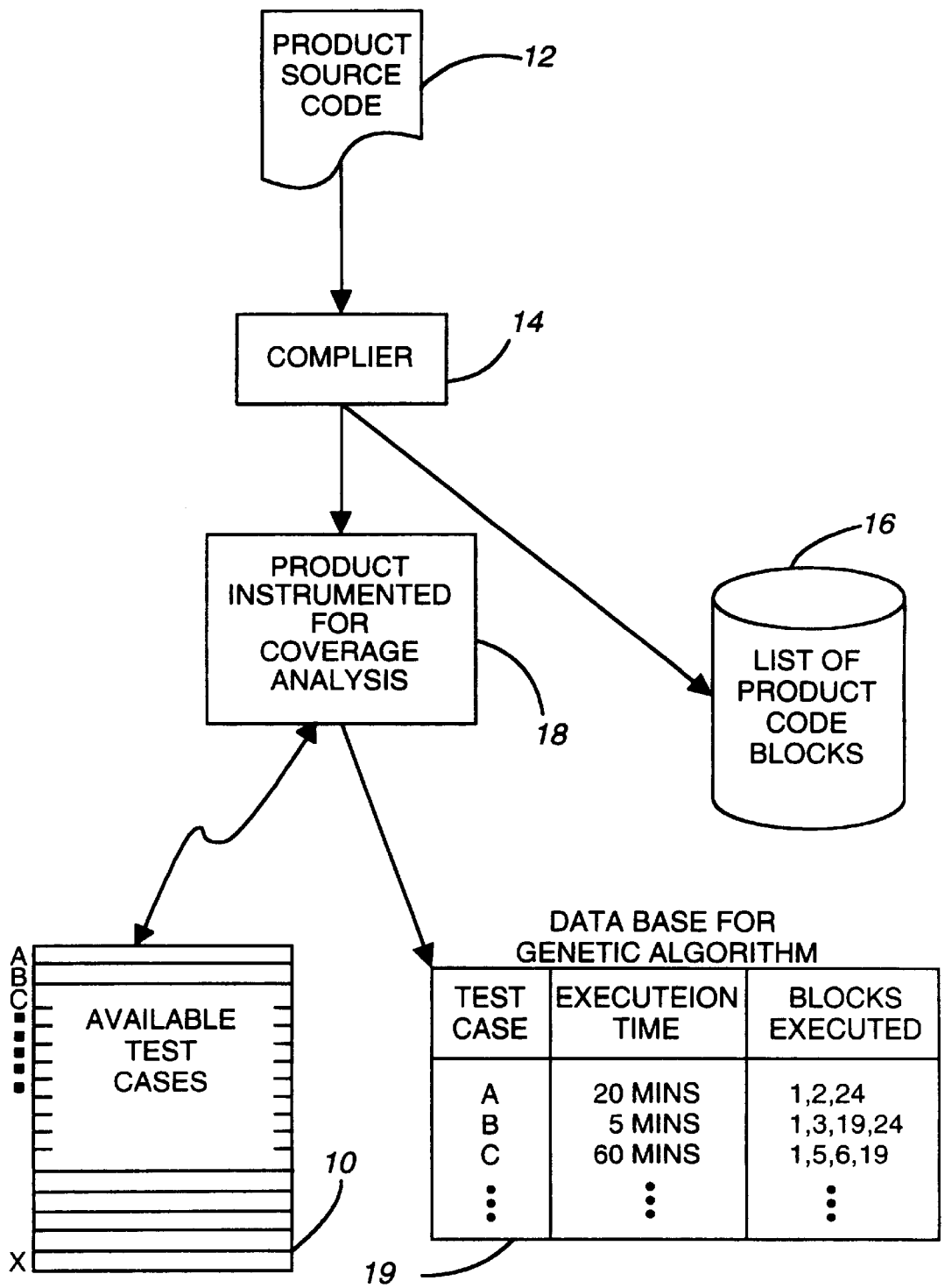
FIG. 2 is a block or flow diagram showing a system and the steps for performing the method according to one embodiment of the invention for identifying or selecting a set of test cases for testing a computer program product.

With reference now to FIG. 2, a block or flow diagram showing the steps for performing the method according to one embodiment of the invention for generating a test for testing a computer program product is shown. Broadly, a preferred embodiment of the method of invention provides for selecting an optimum or near optimum set of test cases for use in a test software program routine or computer program product that is used for testing another computer program product.

Since the method of the invention is particularly well suited to test large, complex computer program products, the program to be tested may have multiple code blocks of software code that may be exercised when the program to be tested is executed. Consequently, normally the program to be tested will have at least some of its code blocks common to a number of other of its code blocks, for example, in subroutines, calls, branches, or the like, so that when a collection of test cases are run on the program to be tested, many of the code blocks will be redundantly executed.

It is assumed that a comprehensive complete collection of test cases has been initially generated or collected by a test designer, in a manner known in the art, to test the assertions made about the software, as described above. In the diagram of FIG. 2, the entire collection of test cases is made available in a list or collection 10.

The goal is to select a set of test cases from the collection 10 of test cases that will exercise as much of the program software as possible in such a way that the particular test cases selected will exercise a maximum percentage of the program in a minimum amount of time. It will be observed, for example, that since many of the program paths may be redundantly exercised, if two (or more) test cases exercises the same program path, along with other noncommon paths, the selection of a test case for inclusion in the finally selected set of test cases that exercises the common path or element would involve selecting the test case that executes in the smaller time. This example, of course is an oversimplification of the process, since generally in complex software products to be tested, each test case will exercise several, if not many, program paths, only some of which may be common to other test cases. Thus, the general goal is to view the software coverage of the entire collection of test cases, and to select those test cases that provide a maximum code coverage in a minimum time.

To identify the optimum set of test cases for testing a program product 12, initially, all of the code blocks in the program 12 to be tested are identified. Typically this may be done by a compiler 14 used to compile the code of the product to be tested. The compiler may be loaded, for example, into the memory 4 of the processor 1, and operated by the CPU 3 in the system shown in FIG. 1, and configured to generate a list 16 of code blocks contained in the product source code as well as an instrumented version of the product. Compilers and compiler operation to generate a list of code blocks and instrumented version of the product are known in the art. For example, one compiler that may be used is that identified as the "SPARCompiler," available from Sun Microsystems of Mountain View, California. The list 16 will be used subsequently in determining the extent or coverage that a particular set of test cases provides.

In addition, the execution time, or runtime, of each of the test cases is determined, and entered into a list, or data base 19, together with the identification of the particular code blocks of the product program 12 that are executed or exercised. It should be noted that although the execution of all of the test cases at least once is required to determine the respective runtimes of each of the test cases, the ultimate goal is to derive a subset of the test cases that exercises a maximum number of the identified code blocks in a minimum amount of time. Thus, when the derived subset of test cases is applied to the target software on all of the various possible combinations of computer models and operating systems on which the target software may be run, significant savings in test time may be realized.

Accordingly, in the data base 19, test case "A" is shown to have a execution time of 20 minutes, and executes blocks 1, 2, and 24. (The particular execution times and blocks executed shown in FIG. 2 are arbitrary numbers for illustration only, and do not have any relationship to any particular test cases or program codes.) The test case "B" is shown to have a execution time of 5 minutes, and executes blocks 1, 3, 19, and 24. It may be observed, for instance, that test cases "A" and "B" both execute blocks 1 and 24, so an opportunity may exist to select one or the other test case, for example, test case "B" to minimize run time for testing these common blocks, if coverage can be obtained elsewhere for block 2 in test case "A".

From the data indicating the identity of each of the code blocks within the product to be tested, and the time each test case takes to execute, a set of test cases are identified for inclusion in the product test routine. As mentioned, the criterion by which any particular test case is selected or rejected for inclusion in a set of test cases is based upon a optimization of the set to test a maximum number of code blocks that can be exercised in a minimum amount of time. It can therefore be seen that the number of code blocks tested, known in the testing art to which this invention pertains as "test coverage," is maximized by the way in which the method of the invention is carried out. It also will be appreciated that the runtime of a program test has a direct relationship to the cost of testing the product, one of the objects of the invention being to minimize or reduce the cost associated with testing the product to be tested.

One way by which the selection of the maximum number of code blocks that can be exercised in a minimum amount of time may be made is through the use of a so-called "genetic algorithm." A genetic algorithm is a search algorithm based on the mechanics of natural selection and natural genetics. Genetic algorithms combine "survival of the fittest" among string structures with a structured, yet randomized, information exchange to form a search algorithm with some of the characteristics of a human search. Various genetic algorithms that are suitable for use in carrying out this selection process are described by David E. Goldberg, *Genetic Algorithms in Search, Optimization & Machine Learning*, Addison-Wesley Publishing Company, Inc., 1989, incorporated herein by reference.

Figures 3, 4, 5:
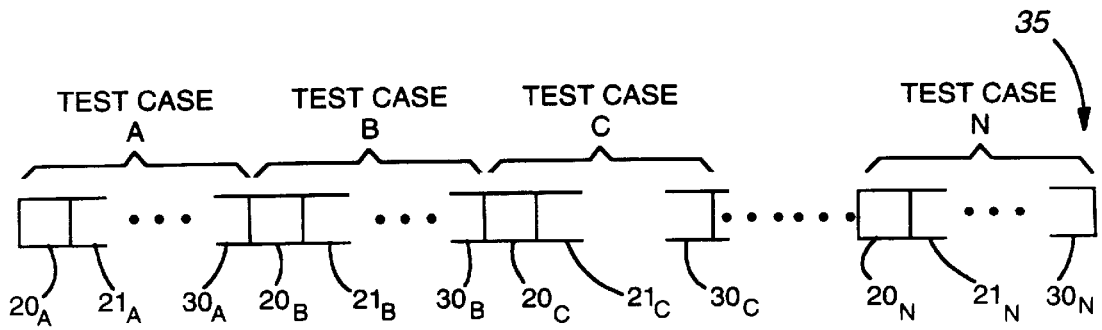
FIG. 3 is a diagram of a concatenated series of words each representing respective test cases for use in performing a genetic algorithm technique for selecting an optimum set of test cases for testing computer program product, according to one embodiment of the invention.
FIG. 4 is a table showing a sequence of selections of sets of test cases via application of a genetic algorithm to the initial and subsequent populations, according to one embodiment of the invention.
FIG. 5 is a table showing the mutating and crossover steps of the genetic algorithm, according to one embodiment of the invention.

Using the genetic algorithm techniques described by Goldberg, for example, with reference now to FIG. 3, a binary number may be generated with each bit representing a possible code block that has been identified. From the data indicating the identity of each of the code blocks exercised by each test case within the product source code to be tested, and the time each test case takes to execute, a representation is generated for each of the test cases. One example of a suitable representation that can be used in conjunction with a genetic algorithm selection technique, as described below, is shown in FIG. 3. As shown, each test case A, B, . . . N is represented by a set of bits, $20_A, 21_A, \ldots 30_A; 20_B, 21_B, \ldots 30_B; 20_C, 21_C, \ldots 30_C; \ldots ; 20_N, 21_N, \ldots 30_N$. The first bit $20_X$ for each test case is assigned a value of "1" if the test case should be included in the selected set and "0" if the test case should not be included. (Although binary characters "1" and "0" are described herein, it should be understood that any suitable character or notation can be used to perform this operation.) Additional bits optional may be included in each set of bits, $20_A \ldots 30_A$ through $20_N \ldots 30_N$, if desired, to allow for additional specific parameters to be associated or evaluated with each test case.

The collection of sets of bits, each representing one of the test cases A, B, . . . N, are then concatenated into a single string 35, shown in FIG. 3, to provide a population representation for use in the genetic algorithm, as next described. The concatenated string 35 may be, for example, M binary bits in length. Thus, the collection of M bits representing all of the test cases can be represented by a sequence of bits, such as "01100 . . . ", "01110 . . . ", and so forth. The particular way by which the test cases are represented is only by way of example; other ways by which the test cases can be represented in genetic algorithm processing will be apparent to those skilled in the art.

A subset of all of the possible bit sequences is then randomly selected, and a fitness value is then determined for each bit combination sequence. One possible fitness value may be, for example, the execution time for the particular path combination represented by the particular bit sequence.

Of course the goal is to maximize the fitness value, or minimize the overall execution time for the code blocks selected. Another possible suitable fitness test is a combination of quality of the tests and cost of test execution. Thus, the fitness value may represent a measure of quality in test coverage (i.e., a number of product code blocks exercised during the test) in conjunction with the execution time for each bit combination. The subset is then evaluated to determine the best fitness values obtained.

To determine the fitness values, with reference now to FIG. 4, a set of L randomly generated binary numbers, or strings, of length M are generated. This initial set of binary numbers is referred to as an "initial population." A fitness value is then determined for each of the randomly generated binary numbers. One way by which the fitness values may be determined for each string is by first decoding the string to determine its encoding. If the string represents a set of test cases that are to be included in a trial set (for example, the first bit of each word being a "1"), the execution time and list of executed code paths of the trial set represented by the random number is calculated from data retrieved from the data base 19. The execution time for the set of test cases represented by each random string is the sum of the execution times for the test cases that are included. The set of executed code paths for the string is the union of the code paths for the included test cases.

The fitness value for each string 1 . . . L is given by the formula:

$$a \cdot (\% \text{ of code blocks covered}) - b \cdot (\text{execution time})$$

where "a" and "b" are weighting factors. The values "a" and "b" also can be established to correct for the difference in units (% coverage and time) between the two factors of the formula, and also may be adjusted, as needed, to adjust for a desired goal in optimizing the selected test set. For example, if a larger percentage of coverage is necessary for a particular test, the value of "a" can be increased. On the other hand, if a smaller time is necessary for the test, the value of "b" can be increased. These value adjustments are arbitrary, and are dependent upon a subjective determination of suitability of coverage versus time for a particular software product test.

For each string 1 . . . L, therefore, a fitness value is determined, and entered into the table, as shown in FIG. 4, as shown, and a total value of all of the calculated fitness values is calculated. In the case shown, the total is 1097. For each of the strings in the "initial population" a ratio is then determined of the calculated individual fitness value for the string divided by the total of all of the fitness values. This ratio is then used as a weight to determine whether or not the particular string should be used in the next string selection iteration. Thus, the ratios are used as probability weights to randomly determine the number of occurrences of each string that should be included in the determination of the next population, shown in FIG. 5.

Iteratively, the subset is reassociated and changed, using crossover and mutation modifications described by Goldberg, supra, and the new subset is reevaluated. The initial population subset is reassociated by associating pairs of stings, for example, into L/2 pairs. For each pair, a randomly selected crossover point is determined. The crossover point is that bit position at which the bits will be swapped between the associated pairs. Once the crossover point has been selected, the substrings between the associated pairs are swapped to form the strings for the next population, seen in FIG. 5. The fitness values for each of the strings is then recalculated, and the process is iteratively repeated between the stages of FIGS. 4 and 5, until a "best" fitness value is determined.

The "best" fitness value may be a value which represents the actual minimum time, or may be a value which merely represents an acceptable time for performing a particular test. The sequence producing the "best" fitness value then represents the combination of code blocks that produces the "best" fitness value. This "best" sequence is then used to construct the final test routine. Since the "best" sequence now identifies the code blocks that should be exercised to maximize the test coverage and minimize the test time, this identification can be used immediately in an abbreviated, efficient test product.

After the iterative process has been completed, a string is derived for use as the final population which has the highest fitness value. This string is interpreted, as described above with reference to FIG. 2. Once the set of test cases has been determined, it may be used to achieve a good tradeoff between test coverage and test execution time on any target operating system and hardware.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for selecting a set of test cases for testing a software program having a number of possible code blocks that may be exercised during execution of the program, the method comprising the steps of:

identifying the code blocks that may be exercised during execution of the program; and executing a genetic algorithm to determine a set of test cases that exercises a maximum number of the identified code blocks in a minimum amount of time, said executing step further comprising:

providing a population representation of each test case;

randomly selecting a subset of said population representation;

determining a fitness value for each subset, said fitness value corresponding to an execution time of the test case and an amount of the code blocks covered by the test case;

totaling the fitness values calculated by said determining step; and deciding if said subset should be included in another population representation for calculating another fitness value until a desired overall fitness value is achieved.

2. A computer program product comprising:

a computer useable medium having computer readable code embodied therein for causing a software test routine to be generated by selecting a set of test cases to test a computer program product to be tested having multiple blocks of code which may be selectively executed, comprising:

computer readable program code devices configured to cause a computer to effect an identification of all of said code blocks in said product to be tested for determining the coverage of said test cases on said code blocks which can be executed;

computer readable program code devices configured to cause a computer to effect a measure of time for executing each of the test cases;

and computer readable program code devices configured to cause a computer to effect an identification of a set of test cases that exercises a maximum number of said identified code blocks in a minimum time, comprising computer readable program code devices configured to cause a computer to execute a genetic algorithm for determining which test cases to use to exercise the computer program product using test time and code coverage as fitness values, wherein said computer readable program code devices configured to cause a computer to execute a genetic algorithm further comprises:

computer readable program code devices configured to cause a computer to effect providing a population representation of each test case;

computer readable program code devices configured to cause a computer to effect randomly selecting a subset of said population representation;

computer readable program code devices configured to cause a computer to effect determining a fitness value for each subset said fitness value corresponding to an execution time of the test case and an amount of the code blocks covered by the test case;

computer readable program code devices configured to cause a computer to effect totaling the fitness values calculated by said determining step; and computer readable program code devices configured to cause a computer to effect deciding if said subset should be included in another population representation for calculating another fitness value until a desired overall fitness value is achieved.

3. The computer program product of claim 2 wherein at least some individual ones of said code blocks are executed by multiple test cases.

* * * * *